United States Patent
Miura (10) Patent No.: US 8,621,443 B2
(45) Date of Patent: Dec. 31, 2013

(54) PROCESSOR EMULATION USING SPECULATIVE FORWARD TRANSLATION

(75) Inventor: Victor Suba Miura, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/555,003

(22) Filed: Jul. 20, 2012

(65) Prior Publication Data

US 2012/0284011 A1 Nov. 8, 2012

Related U.S. Application Data

(63) Continuation of application No. 12/099,712, filed on Apr. 8, 2008, now Pat. No. 8,245,202.

(60) Provisional application No. 60/912,573, filed on Apr. 18, 2007.

(51) Int. Cl.
*G06F 9/45* (2006.01)

(52) U.S. Cl.
USPC .......................................................... 717/136

(58) Field of Classification Search
None
See application file for complete search history.

(56) References Cited

U.S. PATENT DOCUMENTS

| | | | | |
|---|---|---|---|---|
| 5,507,030 A * | 4/1996 | Sites | .............................. | 717/136 |
| 5,870,575 A * | 2/1999 | Kahle et al. | .................... | 712/209 |
| 5,875,318 A * | 2/1999 | Langford | ...................... | 716/103 |
| 6,031,992 A * | 2/2000 | Cmelik et al. | ................ | 717/138 |
| 6,332,216 B1 * | 12/2001 | Manjunath | .................... | 717/141 |
| 6,457,171 B1 * | 9/2002 | Mann et al. | .................... | 717/138 |
| 6,704,925 B1 * | 3/2004 | Bugnion | ....................... | 717/138 |
| 6,986,128 B2 * | 1/2006 | Linden | .......................... | 717/140 |
| 7,058,932 B1 * | 6/2006 | Jennings et al. | ............. | 717/138 |
| 7,203,933 B2 * | 4/2007 | Souloglou et al. | ........... | 717/146 |
| 7,203,934 B2 * | 4/2007 | Souloglou et al. | ........... | 717/146 |
| 7,210,133 B2 * | 4/2007 | Souloglou et al. | ........... | 717/138 |
| 7,228,266 B1 | 6/2007 | Sollom et al. | | |
| 7,328,431 B2 * | 2/2008 | Souloglou et al. | ........... | 717/146 |
| 7,398,373 B2 | 7/2008 | Magoshi | | |
| 7,725,885 B1 * | 5/2010 | Pradhan et al. | ............... | 717/148 |
| 7,856,618 B2 | 12/2010 | Donovan et al. | | |
| 7,870,540 B2 * | 1/2011 | Zare et al. | ..................... | 717/126 |
| 8,245,202 B2 | 8/2012 | Miura | | |

(Continued)

FOREIGN PATENT DOCUMENTS

WO    WO 2007055883 A1 * 5/2007

OTHER PUBLICATIONS

Nonfinal Office Action for U.S. Appl. No. 12/099,712 dated Jul. 19, 2011.

(Continued)

*Primary Examiner* — Don Wong
*Assistant Examiner* — Daxin Wu
(74) *Attorney, Agent, or Firm* — Joshua D. Isenberg; JDI Patent (57) ABSTRACT

A method and apparatus for processor emulation using speculative forward translation are disclosed. A potential candidate for forward translation is identified from one or more portions of target system code. A priority for forward translation is assigned to the potential candidate. It is determined whether the potential candidate is a valid candidate for forward translation. If valid, the potential candidate is translated with a host system to produce one or more corresponding blocks of translated code executable by the host system.

24 Claims, 3 Drawing Sheets

(56) References Cited

U.S. PATENT DOCUMENTS

| | | | |
|---|---|---|---|
| 2002/0019969 A1* | 2/2002 | Hellestrand et al. | 716/5 |
| 2002/0056047 A1 | 5/2002 | Lehman | |
| 2002/0147968 A1 | 10/2002 | Barrenscheen et al. | |
| 2002/0147969 A1* | 10/2002 | Lethin et al. | 717/138 |
| 2005/0183077 A1 | 8/2005 | Langdale et al. | |
| 2007/0143631 A1* | 6/2007 | Gordon et al. | 713/189 |
| 2007/0180438 A1 | 8/2007 | Suba | |
| 2007/0261039 A1 | 11/2007 | Sargaison et al. | |
| 2007/0277052 A1 | 11/2007 | Sargaison et al. | |
| 2008/0040093 A1 | 2/2008 | Sargaison et al. | |

OTHER PUBLICATIONS

Final Office Action for U.S. Appl. No. 12/099,712 dated Jan. 6, 2012.

Cell Broadband Engine Architecture, copyright International Business Machines Corporation, Sony Computer Entertainment Incorporated, Toshiba Corporation Aug. 8, 2005 which may be downloaded at http://cell.scei.co.jp/.

Enhancing server availability and security through failure-oblivious computing, Proceedings of the Sixth Symposium on Operating Systems Design and Implementation (OSDI'04), Rinard et al., Dec. 6-8, 2004.

U.S. Appl. No. 60/746,267 to Stewart Sargaison et al., entitled Translation Block Invalidation Prehints in Emulation of a Target System on a Host System, filed May 3, 2006.

U.S. Appl. No. 60/746,268 to Stewart Sargaison et al., entitled Register Mapping in Emulation a Target System on a Host System, filed May 3, 2006.

U.S. Appl. No. 60/746,273 to Stewart Sargaison et al., entitled Method and Apparatus for Resolving Clock Management Issues in Emulation Involving Both Interpreted and Translated Code, filed May 3, 2006.

U.S. Appl. No. 60/763,568 to Victor Suba, entitled Branch Prediction Thread Management, filed Jan. 30, 2006.

U.S. Appl. No. 60/797,435 to Stewart Sargaison et al., entitled DMA and Graphics Interface Emulation, filed May 3, 2006.

U.S. Appl. No. 60/797,761 to Stewart Sargaison et al., entitled Code Translation and Pipeline Optimization, filed May 3, 2006.

U.S. Appl. No. 60/797,762 to Victor Suba, entitled Stall Prediction Thread Management, filed May 3, 2006.

U.S. Appl. No. 60/912,573 to Victor Suba, entitled Processor Emulation Using Speculative Forward Translation, filed Apr. 18, 2007.

* cited by examiner

PROCESSOR EMULATION USING SPECULATIVE FORWARD TRANSLATION

CLAIM OF PRIORITY

This Application is a continuation of U.S. patent application Ser. No. 12/099,712, filed Apr. 8, 2012, the entire contents of which are incorporated herein by reference. Application Ser. No. 12/099,712 is a non-provisional of and claims the benefit of priority of commonly-assigned co-pending U.S. Provisional Patent Application No. 60/912,573 filed Feb. Apr. 18, 2007, the entire contents of which are incorporated herein by reference.

This application is likewise a non-provisional of and claims the benefit of priority of commonly-assigned co-pending U.S. Provisional Patent Application No. 60/912,573 filed Feb. Apr. 18, 2007, the entire contents of which are incorporated herein by reference.

CROSS-REFERENCE TO RELATED APPLICATION

This application is related to U.S. provisional application No. 60/746,267, to Stewart Sargaison et al, entitled TRANSLATION BLOCK INVALIDATION PREHINTS IN EMULATION OF A TARGET SYSTEM ON A HOST SYSTEM, filed May 3, 2006, the entire disclosures of which are incorporated herein by reference. This application is related to U.S. provisional application No. 60/746,268, to Stewart Sargaison et al, entitled REGISTER MAPPING IN EMULATION A TARGET SYSTEM ON A HOST SYSTEM, filed May 3, 2006, the entire disclosures of which are incorporated herein by reference. This application is related to U.S. provisional application No. 60/746,273 METHOD AND APPARATUS FOR RESOLVING CLOCK MANAGEMENT ISSUES IN EMULATION INVOLVING BOTH INTERPRETED AND TRANSLATED CODE, filed May 3, 2006, the entire disclosures of which are incorporated herein by reference. This application is related to U.S. provisional application No. 60/797,762, to Victor Suba, entitled STALL PREDICTION THREAD MANAGEMENT, filed May 3, 2006, the entire disclosures of which are incorporated herein by reference. This application is related to U.S. provisional application No. 60/797,435, to Stewart Sargaison et al, entitled DMA AND GRAPHICS INTERFACE EMULATION, filed May 3, 2006, the entire disclosures of which are incorporated herein by reference. This application is also is related to U.S. provisional application No. 60/797,761, to Stewart Sargaison et al, entitled CODE TRANSLATION AND PIPELINE OPTIMIZATION, filed May 3, 2006, the entire disclosures of which are incorporated herein by reference.

This application is related to U.S. patent application Ser. No. 11/700,448, filed Jan. 30, 2007, which claims the benefit of priority of U.S. provisional patent application No. 60/763,568 filed Jan. 30, 2006. The entire disclosures of application Ser. Nos. 11/700,448 and 60/763,568 are incorporated herein by reference.

This application is related to commonly-assigned, co-pending application Ser. No. 11/696,684, to Stewart Sargaison et al, entitled TRANSLATION BLOCK INVALIDATION PREHINTS IN EMULATION OF A TARGET SYSTEM ON A HOST SYSTEM, filed Apr. 4, 2007, the entire disclosures of which are incorporated herein by reference. This application is related to commonly-assigned, co-pending application Ser. No. 11/696,691, to Stewart Sargaison et al, entitled REGISTER MAPPING IN EMULATION A TARGET SYSTEM ON A HOST SYSTEM, filed Apr. 4, 2007, the entire disclosures of which are incorporated herein by reference. This application is related to commonly-assigned, co-pending application Ser. No. 11/696,699, to Stewart Sargaison et al, entitled METHOD AND APPARATUS FOR RESOLVING CLOCK MANAGEMENT ISSUES IN EMULATION INVOLVING BOTH INTERPRETED AND TRANSLATED CODE, filed Apr. 4, 2007, the entire disclosures of which are incorporated herein by reference.

FIELD OF THE INVENTION

Embodiments of this invention relate to emulation of a target computer platform on a host computer platform and more particularly to runtime software translation as used in emulation of a target architecture onto a host architecture by use of speculative forward translation.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. Due to the well known slowness of software emulation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Some runtime translation systems use a method known as Just In Time (JIT) translation to translate target software into host software on an as-needed basis. Examples emulation employing JIT translation schemes are described, e.g., in U.S. patent application Ser. Nos. 11/696,684, 11/696,691 and 11/696,699, which have been incorporated by reference above. Such a runtime JIT scheme is often used in translating target software of a dynamic nature. In software that is dynamic in nature, portions of code may change dynamically prior to execution. For example, within the target system, executable code may change dynamically through the loading of new executables, loading of overlays, runtime code generation or self-modifying code. Dynamic code changes may also occur by modifying memory through a number of pathways such as by executing system calls, via direct memory access (DMA) transfers from various devices, or simply by executing user code.

One of the problems of JIT translation is that the translation is performed on an as needed basis, at a point where the target software can no longer continue executing without further translation. If the underlying target system code is dynamic, the entire load of software translation may be placed onto the critical execution path of the software. Within a real time system this may cause an undesired execution slowdown when the translation load peaks.

It is within this context that embodiments of the present invention arise.

SUMMARY

Embodiments of the invention are directed to a method and system for improving execution performance within the area of runtime software translation as used in emulation of a target architecture onto a host architecture by use of speculative forward translation. According to an embodiment, a translation load may be moved off of the critical execution path by speculatively translating target system code ahead of the target software execution on different logical execution threads. In this way much of the translation load may be moved onto different resources such as other hardware processors if available, or can be performed at well defined intervals on a single processor system,—where a well defined translation interval load is more desirable than unpredictable JIT translation load peaks.

Embodiments of the invention may use heuristic methods for determining candidate code for speculative translation, and eliminating bogus candidates. Embodiments of the invention may incorporate methods for scheduling speculative translation loads, methods for efficient translation cache management in a speculative translation system, and methods for maintaining safety and coherence in a speculative translation system.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention.

Figure 1:
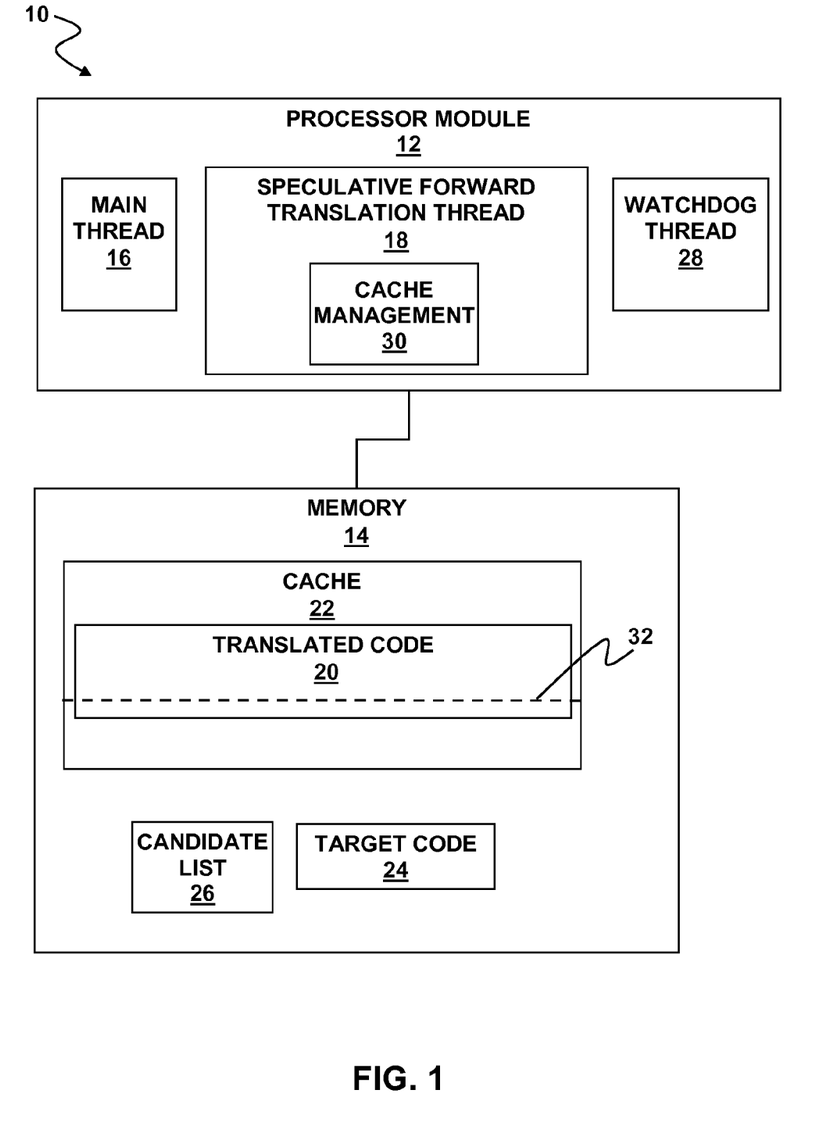
FIG. 1 is a block diagram of a system implementing speculative forward translation according to an embodiment of the present invention.
Figure 2:
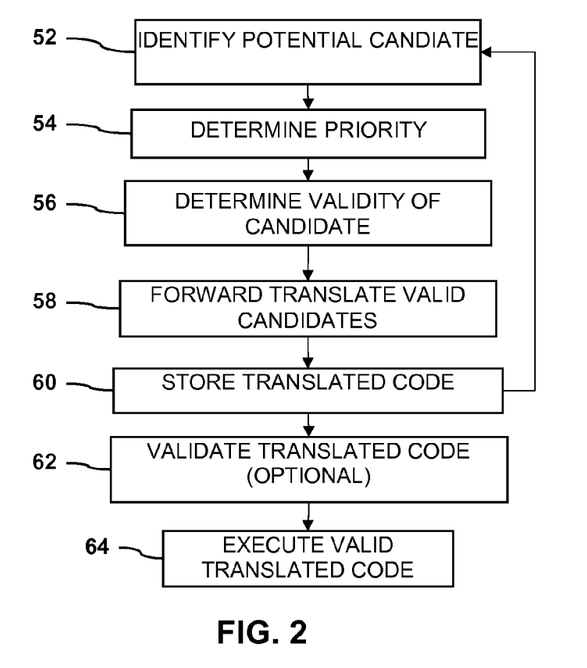
FIG. 2 is a flow diagram of a speculative forward translation method according to an embodiment of the present invention.

Embodiments of the invention may be understood by referring to FIG. 1 and FIG. 2 simultaneously. FIG. 1 is a block diagram of a host system 10 employing speculative forward translation. The system generally comprises a processor module 12 coupled to a memory 14. The processor module 12 may be a single core or multi core processor. The memory 14 may be any suitable type of computer memory, e.g., random access memory (RAM). A main execution thread 16 runs on the processor module 12. The main execution thread 16 may be part of a larger program that emulates a target system on the host system 10. A speculative forward translation thread 18 is configured to run on the processor module 12 at low priority while the main execution thread 16 translates and executes code. Translated code 20 produced by the main thread 16 and speculative forward translation thread 18 may be stored in a location in memory 14, e.g., a cache 22. Portions of target system code 24 may be stored in memory prior to translation by the main execution thread 16 or forward translation thread 18. To match a dynamic target system, it is desirable for the forward translation thread 18 to dynamically determine candidate target system code 24 for speculative forward translation. The speculative forward translation thread 18 may use heuristic methods for determining candidate code for speculative translation, and eliminating bogus candidates.

As seen from the flow diagram of FIG. 2, the speculative forward translation thread 18 may identify a potential candidate for forward translation as indicated at 52. By way of example, such speculative forward translation may be initiated by a just in time (JIT) translation request from the main thread 16. As used herein a JIT request refers to a request to translate an area of target code 24 that has not been translated before and is about to be executed. A JIT request may comprise a memory address that is about to be executed with complete certainty; therefore such an address may have a high probability of being a valid code area. The memory area of target code 24 corresponding to the JIT request may be analyzed, and potential translation targets to other code may be determined. For example if the area contains function calls or jumps to other target code that has not yet been translated, those targets are potential candidates for speculative translation. The speculative forward translation thread 18 may also look around a function that's currently being translated, e.g., by the main thread 16. For example code that is about to be executed is likely to be valid code. If the code around it also looks like a function that has a stack that is incremented or decremented and has a return instruction then that code may be identified as a candidate for speculative forward translation.

Referring again to FIG. 2, the forward translation thread 18 may assign priorities for speculative forward translation, as indicated at 54. The priorities may be assigned based on likelihood of imminent execution. Candidates that are more likely to be imminently executed may be assigned a higher priority. By way of example, and without loss of generality, direct function calls may be assigned a relatively high priority since they are likely to be executed soon. Candidates stemming from function calls or jumps around memory have the properties of a high probability of being valid code, and a high probability of being executed soon, therefore they may also be considered high priority candidates for speculative translation.

Other candidates may include code targets that do not stem from the JIT request area, but from surrounding code areas. Since the JIT request area has a high probability of being a valid code area, the surrounding areas of target code 24 may also have a high probability of being valid code. However, although surrounding code has high probability of being valid, there may be no indicator if that code will be executed soon. Therefore these potential candidates may be considered low priority candidates for speculative translation.

It is noted that the forward translation thread 18 need not wait for a JIT translation request. Alternatively, the forward translation thread may search for and identify candidates for forward translation from the target code 24 in memory 14 when the main thread 16 is idle. The forward translation thread 18 may be configured to compare potential candidates against entries in the cache 22 to avoid translating portions of target code 24 that have already been translated and stored in the cache 22 as translated code 20. When the forward translation thread 18 gets a cache miss on a particular portion of target code 24 it may begin identifying whether the portion is a suitable candidate for speculative forward translation. During this time, the forward translation thread may also try to look ahead at what other portions of target code 24 might run from the particular portion. For example if the particular portion includes a function that calls some address the forward translation thread 18 may save that address for potential forward translation. Also if the function has a switch statement, e.g., a jump table, the speculative forward translation thread 18 may look at jump table entries for potential candidates since those switch entries might be executed later. Entries for potential candidates for speculative forward translation may be saved attached to their blocks so that if their block is deleted the forward translation thread 18 won't follow the chain and speculatively translate anything associated with the block anymore.

Potential candidates for speculative forward translation may be stored in a list 26, e.g., in memory 14. The speculative forward translation thread 18 may select candidates for forward translation from the list 26. For example, a first function may call a second function. The first function call has higher priority than the second function call since the first function is closer to the main execution thread 16. The second function call has a lower probability of being executed soon. Blocks that are translated may be stored in the cache 22 as translated code 20 for subsequent validation and execution.

Once potential candidates have been identified, heuristics may be used to determine the validity of these candidates for forward translation, as indicated at 56. For example, candidates in the list 26 that are outside of valid memory areas may be discarded as invalid. A target of a function call doesn't meet an expected structure of a typical function may be discarded. Candidates containing illegal instructions may be discarded as invalid. In addition, candidates that are determined to contain little or no useful instructions they are discarded. For example, a relatively large piece of memory (e.g., about 1 Kbyte) that has no branches or contains a whole bunch of no operation (NOP) instructions or add 1 to self instructions, may be regarded more or less as data for the purposes of speculative forward translation. Such an area of memory may be regarded as containing little or no useful instructions. To identify such areas of memory, the speculative translation thread 18 may look for occurrences of certain types of instructions to occur at certain frequencies. For example function return instructions (e.g., JRRA) may be expected to occur less frequently in areas of memory containing data than in areas of memory 14 containing useful instructions.

If such instructions occur below some threshold frequency in a section of memory then that section is likely to contain data and not useful instructions. Furthermore, instructions for reading from and/or storing to a stack register are likely to be associated with useful instructions if they occur with sufficient frequency in an area of memory 14.

Once potential candidates for forward translation have been validated, the corresponding portions of target code 24 may be forward translated as indicated at 58. By way of example, during idle time on the main thread 16 the speculative forward translation thread 18 may go through the list 26 and translate blocks in the list recursively according to priority. The forward translation thread 18 may be configured to stop speculatively translating if it hits an invalid instruction. Forward translation may proceed along the same lines as any regular, e.g., JIT translation request by the main thread 16. Forward translated code may be stored as indicated at 60. By way of example, the forward translated code may be stored e.g., in the cache 22 as part of the translated code 20. Translated code 20 may undergo validation at 62, e.g., as described above, prior to being executed as indicated at 64. Where the target code 24 is dynamic in nature it is possible for portions of the target code 24 corresponding to translated code 20 to have been changed since they were initially translated. Thus, it is often desirable to validate translated code 20, including speculatively forward translated code before executing it. Speculatively forward translated code blocks may be validated in the same way as translated code generated by the main thread 16. Examples of validation of translated code are described, e.g., U.S. provisional application No. 60/746,267 and U.S. patent application Ser. No. 11/696,684, both of which were incorporated herein by reference above.

Scheduling Speculative Translation Loads

Embodiments of the invention may be implemented on a host system having a single core or multi core processor. An example of a multi core host system is a cell-processor based system, such as the Sony PlayStation 3. In a multi core host system, speculative translation may be scheduled on a different core than the main target code execution thread. This allows the main target code thread to execute with minimal interference from speculative translation. The speculative translation thread 18 may execute at a low priority so that it does not entirely occupy a full processor core.

In another possible configuration both the main target code execution thread 16 and the speculative translation thread 18 may execute on the same processor core in a time-sharing fashion. By doing this the overall performance of the main execution thread may be moderately reduced. However, overall performance may still benefit from the advantages of speculative translation.

In another possible configuration both the main execution thread 16 and the speculative forward translation thread 18 may execute on the same processor core in a time-sharing fashion by identifying times when the main execution thread is idle or executing non-critical code and using those times for speculative translation. This can benefit from the advantages of speculative translation without the penalty of time-sharing.

Methods For Efficient Translation Cache Management in a Speculative Translation System Speculative translation is more beneficial if translations are appropriately and efficiently cached for future execution, and if there are sufficient memory in which to cache speculative translations. By doing speculative translation the cache is likely to be filled fairly quickly. For this reason it is desirable to (1) control cache space usage to minimize cache thrashing; (2) eliminate old, invalid or unnecessary translations from the cache to make room for new translations; (3) efficiently allocate and de-allocate translation cache memory; and (4) deal efficiently with situations where the cache becomes full or unable to allocate memory of a required size. These four goals may be addressed as discussed below.

In some prior art techniques involving JIT translation, the cache was flushed once it became filled. However, doing so would defeat the purpose of speculative forward translation. To avoid filling up the cache too quickly stale entries may be removed from the cache 22. As used herein a stale entry refers to a block of speculatively forward translated code for which the underlying code has changed. To find such stale entries a watchdog thread 28 may be implemented on the processor module 12. The watchdog thread 28 checks to see if portions of the translated code 20 have been changed and throws away stale entries. By way of example, the watchdog thread 28 may checksum all entries in the memory 14 to see if any code entries have changed. Alternatively, the watchdog thread 28 could checksum the cache 22 to see if any portions of the translated code 20 therein have changed. By way of example, the watchdog thread 28 may perform a checksum on the cache line size, e.g., 64 bytes. The watchdog thread 28 may include a bitmap with one bit per block that indicates whether or not there is code in a given block of memory 14. If there is no code in a given block, the watchdog thread 28 may skip checking it. Depending on the speed of the processor module 12 and the size of the memory 14, a low priority watchdog thread 28 may be able to check all of the memory 14 in about 1 second through use of such a scheme.

As set forth above, the speculative forward translation thread 16 may keep track of what translated code is in cache so that it doesn't translate something that's already in the translation cache 22. Portions of target code 24 may be retranslated their corresponding translations have been removed from the cache (e.g., due to invalidation).

To efficiently allocate and de-allocate translation cache memory the cache 22 may be configured as a heap structure that is doubly linked so that it can quickly free up space for allocation and use free lists to allow for quick allocation of space in the cache 22. In heap-based memory allocation, memory is allocated from a large pool of unused memory area called the heap (also called the free store). The size of the memory allocation may be determined at run-time, and the lifetime of the allocation is not dependent on the current procedure or stack frame. The region of allocated memory may be accessed indirectly, e.g., via a reference (an object containing information that refers to data stored elsewhere). A free list is a data structure used in a scheme for dynamic memory allocation. Free lists may operate by connecting unallocated regions of memory together in a linked list, using the first word of each unallocated region as a pointer to the next. A linked list is a data structures made of a sequence of nodes, each containing arbitrary data fields and one or two references ("links") pointing to the next and/or previous nodes. A linked list is sometimes referred to as a self-referential data type because it contains a pointer or link to another data of the same type. In a doubly linked list each node has two links: one points to the previous node, or points to a null value or empty list if it is the first node; and one points to the next, or points to a null value or empty list if it is the final node. Free lists make allocation and de-allocation operations very simple. To free a region, it is just added to the free list. To allocate a region, a single region is removed from the end of the free list and used.

If cache 22 becomes full and cache space needs to be allocated for a block that wouldn't otherwise fit in the cache the speculative forward translation thread 18 may include (or may call upon) a cache management routine 30 having one or more instructions that delete entries from a defragmentation pointer 32 onwards until it makes a space which is large enough. Ordinarily, cache entries are allocated in the order in which they are to be executed. The defragmentation pointer 32 goes through the cache 22 like a ring buffer and cache entries are deleted in the order in which they were allocated. There may be a small probability that the defragmentation pointer 32 may coincide with a location of code that has just been translated. Although perhaps undesirable in principle, the probability of this occurring may be small enough that the benefits of being able to free up cache space when needed outweigh the disadvantages.

Figure 3A:
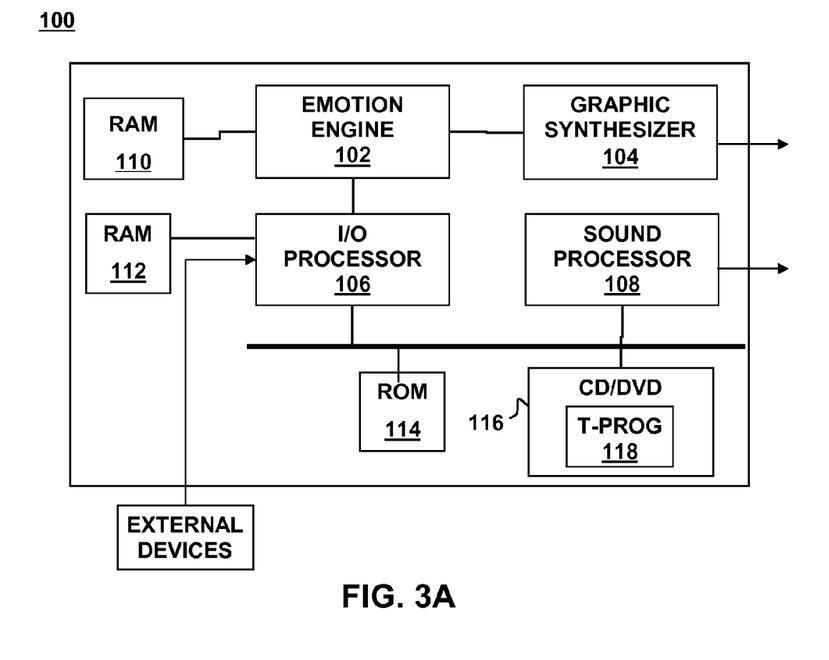
FIG. 3A is a block diagram of an example of a target device that may be emulated using speculative forward translation according to an embodiment of the present invention.

By way of example FIG. 3A depicts a block diagram of an example of a target system 100 in the form of a game console device, a Sony Playstation®2. PlayStation is a registered trademark of Sony Computer Entertainment Corporation of Tokyo, Japan. In this example, the target system 100 is built around a main processor module 102 referred to as an emotion engine, a Graphic Synthesizer 104, an input/output (I/O) processor (IOP) 106 and a sound processor unit 108. The emotion engine 102 typically includes a CPU core, co-processors and a system clock and has an associated random access memory (RAM) 110. The emotion engine 102 may perform animation calculation, traverse a scene and convert it to a two-dimensional image that may be sent to the Graphic Synthesizer (GS) 104 for rasterization.

Figure 3B:
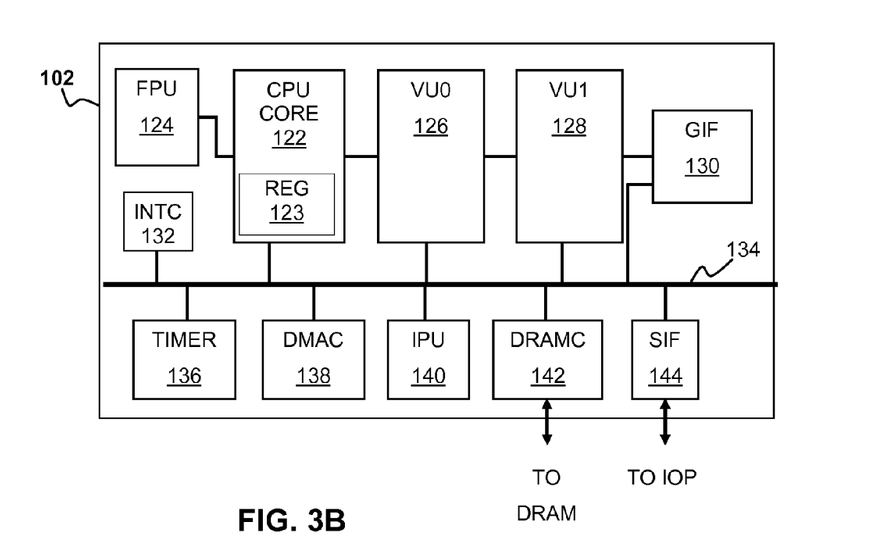
FIG. 3B is a block diagram of an emotion engine of the target device of FIG. 3A.

As shown in FIG. 3B, the EE 102 may include a CPU core 122, with an associated floating point unit (FPU) coprocessor 124, first and second vector co-processors 126, 128, a graphics interface controller 130 and an interrupt controller (INTC) 132. The CPU 122, vector co-processors 126, 128, GIF 130 and INTC 132 may be coupled to a 128-bit main bus 134. The FPU 124 may be directly coupled to the CPU 122. The CPU 122 may be coupled to a first vector co-processor (VU0) 126, which is, in turn, may be coupled to a second vector co-processor (VU1) 128. The second vector co-processor VU1 128 may be coupled to a graphics interface (GIF) 130. The EE 102 additional may include a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. These instructions may be handled using 128-bit registers 123. The CPU 122 may include a data cache, an instruction cache and an area of on-chip memory sometimes referred to as a scratchpad. The scratchpad serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 may serve as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 108 or IOP RAM 112 and executed by the various processors of the target system 100 in a native machine code that can be read by these processors.

In embodiments of the present invention, target system instructions involving direct memory access (DMA) from the IOP 106 or the scratchpad, may be used as pre-hints for invalidation of translated target system code, as described above.

Figure 4:
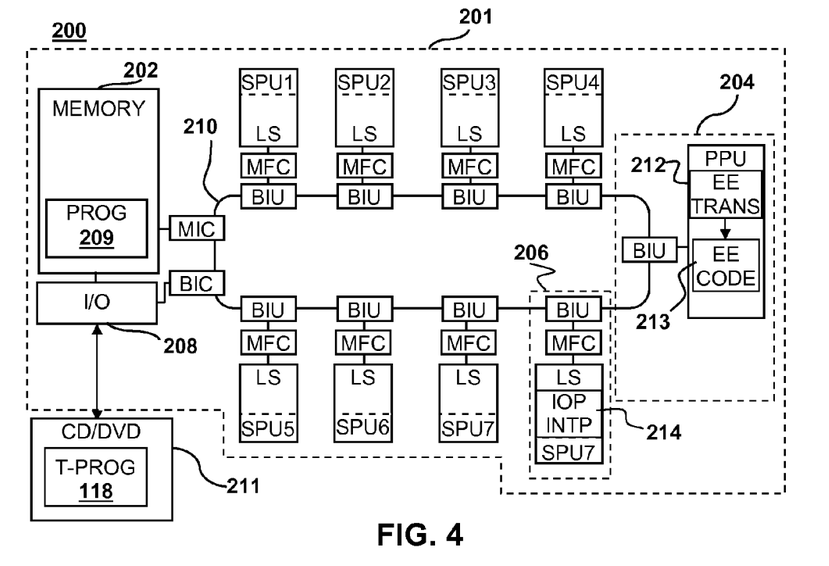
FIG. 4 is a schematic diagram of an example of a host device that may emulate the target device of FIGS. 3A-3B.

In embodiments of the present invention, the target system 100 may be emulated using a parallel processing host system 200 so that the host system 200 can run programs written in code native to the target system 100 such as target program 118. FIG. 4 depicts an example of a host system 200 based on a cell processor 201 that may be configured to emulate the target system 100. An example of a cell processor is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The cell processor 201 may include a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 may communicate with each other and with an I/O device 208 over a ring-type element interconnect bus (EIB) 210. The I/O device 208 may communicate with the EIB 210 via a bus interface controller (BIC). The PPE 204 and SPEs 206 can access the EIB 210 through bus interface units (BIU). The PPE 204 and SPEs 206 can access the main memory 202 over the EIB 210 through memory flow controllers (MFC).

The main memory may interface with the EIB 210 via a memory interface controller (MIC) The memory 202 may contain an emulation program 209 that implements interpretation and translation of coded instructions written for the target system 100. The emulation program 209 may implement speculative forward translation as described above with respect to FIG. 1 and FIG. 2. Specifically, the emulation program 209 may include the main thread 16, forward translation thread 18 and watchdog thread 28 described above. The coded target system instructions may be read from a CD/ROM disc in a CD/DVD reader 211 coupled to the I/O device 208. A CD/ROM disc containing the target program 118 may be loaded into the CD/DVD reader 211. In certain embodiments of the invention, the program 209 may identify candidates for forward translation from the target program 118, assign priority and determine validity of the candidate and perform forward translation where appropriate. Translated code 213 may be stored in a cache associated with the PPE 204.

By way of example, in an embodiment of the invention, the program 209 may implement a translator 212, e.g., including the main thread 16, forward translation thread 18 and watchdog thread 28 running on the PPE 204. The translator 212 may emulate the EE 102 of the target system 100 by translating EE instructions of the target program 118 into translated code 213 that can be run on the PPE 204. In certain embodiments of the invention a dedicated SPE 206 may implement a software interpreter 214 that emulates the IOP 106 by interpreting IOP instructions of the target program 118.

Embodiments of the invention provide a simple yet effective solution to performance problems due to large translation loads associated with emulation using JIT translation.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for emulating a target system on a host system having one or more processors, the method comprising:
    a) identifying one or more potential candidates for forward translation from one or more portions of target system code, wherein said identifying the potential candidates includes searching for the potential candidates in an area of memory corresponding to a portion of target system code for which a translation request has been issued by a main execution thread;
    b) assigning a priority for forward translation to each of the potential candidates;
    c) determining whether the potential candidates are valid candidates for forward translation; and
    d) translating the potential candidates determined to be valid candidates with the host system to produce one or more corresponding blocks of translated code executable by the host system.

2. The method of claim 1, further comprising validating the translated code by determining whether the corresponding target system code has been changed since it was translated.

3. The method of claim 1, further comprising executing the translated code with the host system.

4. The method of claim 1 wherein said searching for the potential candidates includes searching for function calls or jumps to other target code that has not yet been translated and identifying the function calls or the other target code as at least some of the potential candidates.

5. The method of claim 1, wherein said searching for the potential candidates includes searching around a function that is about to be executed for a function that has a stack that is incremented or decremented and has a return instruction and identifying the function that has the stack as at least one of the potential candidates.

6. The method of claim 1, wherein b) comprises assigning the priority based on a likelihood of imminent execution of the potential candidates.

7. The method of claim 1 wherein c) comprises discarding a target of a function call if it doesn't meet an expected structure of a typical function.

8. The method of claim 1 wherein c) comprises discarding a potential candidates containing an illegal instruction.

9. The method of claim 1 wherein d) includes stopping translation if an invalid instruction is encountered.

10. The method of claim 1, wherein c) includes determining whether a potential candidate contains little or no useful instructions and discarding the potential candidate if it contains little or no useful instructions.

11. The method of claim 1, further comprising storing the translated code in a cache.

12. The method of claim 11, further comprising periodically removing stale entries from the cache.

13. The method of claim 11, further comprising deleting entries from a defragmentation pointer onwards until sufficient space is available in the cache for a block of translated code that would not otherwise fit in the cache.

14. A host system for emulating a target system, the host system comprising:
   a processor module coupled to a memory;
   a main execution thread containing processor executable instructions adapted to be executed by the processor module; and
   a speculative forward translation thread containing processor executable instructions adapted to be executed by the processor module, wherein the speculative forward translation thread includes:
   a) an instruction that, when executed, identifies one or more potential candidates for forward translation from one or more portions of target system code, wherein, when executed, said instruction that identifies the potential candidates searches for the potential candidates in an area of memory corresponding to a portion of target system code for which a translation request has been issued by the main execution thread;
   b) an instruction that, when executed, assigns a priority for forward translation to each of the potential candidates;
   c) an instruction that, when executed, determines whether the potential candidates are valid candidates for forward translation; and
   d) an instruction that, when executed, translates the potential candidates determined to be valid candidates to produce one or more corresponding blocks of translated code executable by the host system.

15. The host system of claim 14 wherein the processor module includes a single core processor, and wherein the speculative forward translation thread and the main execution thread are adapted to be executed by the single core processor in a time-sharing fashion.

16. The host system of claim 14 wherein the processor module includes a multi core processor, and wherein the speculative forward translation thread and the main execution thread are adapted to be executed by different cores of the multi core processor.

17. The host system of claim 16 wherein the multi core processor is a cell processor.

18. The host system of claim 14, wherein the memory includes a cache and wherein the speculative forward translation thread includes an instruction that, when executed, stores the blocks of translated code in the cache.

19. The host system of claim 18, further comprising a watchdog thread adapted to be executed by the processor module, wherein the watchdog thread includes one or more instructions that, when executed periodically remove stale translated code entries from the cache.

20. The host system of claim 18, further comprising one or more instructions that, when executed, delete entries in the cache from a defragmentation pointer onwards until sufficient space is available in the cache for a block of translated code that would not otherwise fit in the cache.

21. The host system of claim 18 wherein the cache is configured as a heap structure that is doubly linked.

22. The host system of claim 14, further comprising one or more instructions that, when executed, validate one or more of the blocks of translated code prior to their execution.

23. The host system of claim 14, wherein the main execution thread further comprises one or more instructions that, when executed, cause one or more of the blocks of translated code to be executed by the processor module.

24. The host system of claim 15, wherein the speculative forward translation thread is adapted to be executed on the single core processor during times when the main execution thread is idle or executing non-critical code.

* * * * *